United States Patent
Olofsson et al.

(10) Patent No.: US 6,731,707 B1
(45) Date of Patent: May 4, 2004

(54) ARRANGEMENT FOR SYNCHRONIZATION OF NODES IN VDSL-SYSTEMS

(75) Inventors: Sven-Rune Olofsson, Luleå (SE); Joachim Johansson, Luleå (SE); Mikael Isaksson, Luleå (SE); Hans Öhman, Luleå (SE); Daniel Bengtsson, Luleå (SE); Lennart Olsson, Luleå (SE); Anders Isaksson, Luleå (SE); Göran Ökvist, Luleå (SE); Lis-Mari Ljunggren, Luleå (SE); Hans Lundberg, Luleå (SE); Tomas Stefansson, Luleå (SE); Gunnar Bahlenberg, Luleå (SE); Sivert Håkansson, Järfälla (SE); Magnus Johansson, Luleå (SE)

(73) Assignee: STMicroelectronics N.V., Amsterdam (NL)

( * ) Notice: Subject to any disclaimer, the term of this patent is extended or adjusted under 35 U.S.C. 154(b) by 0 days.

(21) Appl. No.: 09/446,120

(22) PCT Filed: Jun. 10, 1998

(86) PCT No.: PCT/SE98/01115
§ 371 (c)(1),
(2), (4) Date: Aug. 24, 2000

(87) PCT Pub. No.: WO99/00928
PCT Pub. Date: Jan. 7, 1999

(30) Foreign Application Priority Data

Jun. 26, 1997 (SE) .............................................. 9702481

(51) Int. Cl.[7] .............................. H04L 7/00; H04J 3/06
(52) U.S. Cl. ....................................... 375/356; 370/503
(58) Field of Search ................................. 375/356, 220, 375/222; 370/350, 353, 354, 507; 455/502

(56) References Cited

U.S. PATENT DOCUMENTS

| | | | | |
|---|---|---|---|---|
| 5,666,330 A | * | 9/1997 | Zampatti | 368/47 |
| 6,317,475 B1 | * | 11/2001 | Kasurinen | 375/356 |
| 6,373,834 B1 | * | 4/2002 | Lundh et al. | 370/350 |

* cited by examiner

*Primary Examiner*—Stephen Chin
*Assistant Examiner*—Lawrence Williams
(74) *Attorney, Agent, or Firm*—Lisa K. Jorgenson; Allen, Dyer, Doppelt, Milbrath & Gilchrist, P.A.

(57) ABSTRACT

An arrangement for synchronization of nodes in VDSL-systems, or more exactly, synchronization of optical VDSL-nodes which share a common part of a cable in the access network between subscribers and a local station. A time synchronization is provided towards an external system, for instance GPS, which gives a time reference by which the different nodes can be synchronized. The synchronization reduces the near end cross-talk between the VDSL-systems in the different nodes. Preferably, each respective node includes a receiver for a synchronization signal and an internal oscillator with high stability to deliver a stable clock signal.

15 Claims, 1 Drawing Sheet

ARRANGEMENT FOR SYNCHRONIZATION OF NODES IN VDSL-SYSTEMS

This application is a 371 of PCT/SE98/01115 Jun. 10,1998.

BACKGROUND OF THE INVENTION

1. Field of the Invention

The present invention relates to an arrangement for synchronization of nodes in VDSL-systems, or more exactly, synchronization of optical VDSL-nodes which share a common part of a cable in the access network between the subscribers and the local station. The invention provides a time synchronization towards an external system, for instance GPS, which gives a time reference by which the different nodes can be synchronized. The synchronization reduces the near end cross talk between the VDSL-systems in the different nodes.

2. Discussion of the Background

Systems with VDSL (Very high Data rate Digital Subscriber Line) are previously known. In the VDSL-system a node, preferably optical, is placed between the copper cable to the subscriber and an optical fibre to the local station. By minimizing the length of the copper cable, the data rate can be maximized. In some cases different VDSL-systems in different optical nodes can share the same cable in a part of the access network. A problem is that near end cross talk between the systems can arise in the optical nodes if the optical nodes are not synchronized so that the orthogonality between the signals are maintained.

The invention solves the problem by synchronizing the nodes towards an external system which gives a stable time reference, for instance GPS. Synchronization towards external systems is as such previously known, for instance in the paging system Mini Call which utilizes GPS-receivers. This, however, solves another problem than the present invention.

SUMMARY OF THE INVENTION

Consequently the following invention provides an arrangement for synchronization of nodes in VDSL-systems which have VDSL-nodes between a local station and subscribers of above mentioned kind, where the nodes have separate connections to one point, and a common access connection from the point to the subscribers. According to the invention the nodes are synchronized to a common external time reference.

Preferably respective node includes a receiver for a synchronization signal and an internal oscillator with high stability for delivering a stable clock signal.

The invention is defined in the following patent claims which also indicate preferred embodiments of the invention.

Thanks to the arrangement of the invention, a minimization of the cross talk is made possible between VDSL-systems which results in higher capacity and longer range.

BRIEF DESCRIPTION OF THE DRAWINGS

The invention will be described in detail below with reference to enclosed drawings, of which the only FIGURE shows a diagram of an embodiment of the invention.

DETAILED DESCRIPTION OF PREFERRED EMBODIMENTS

Figure 1:
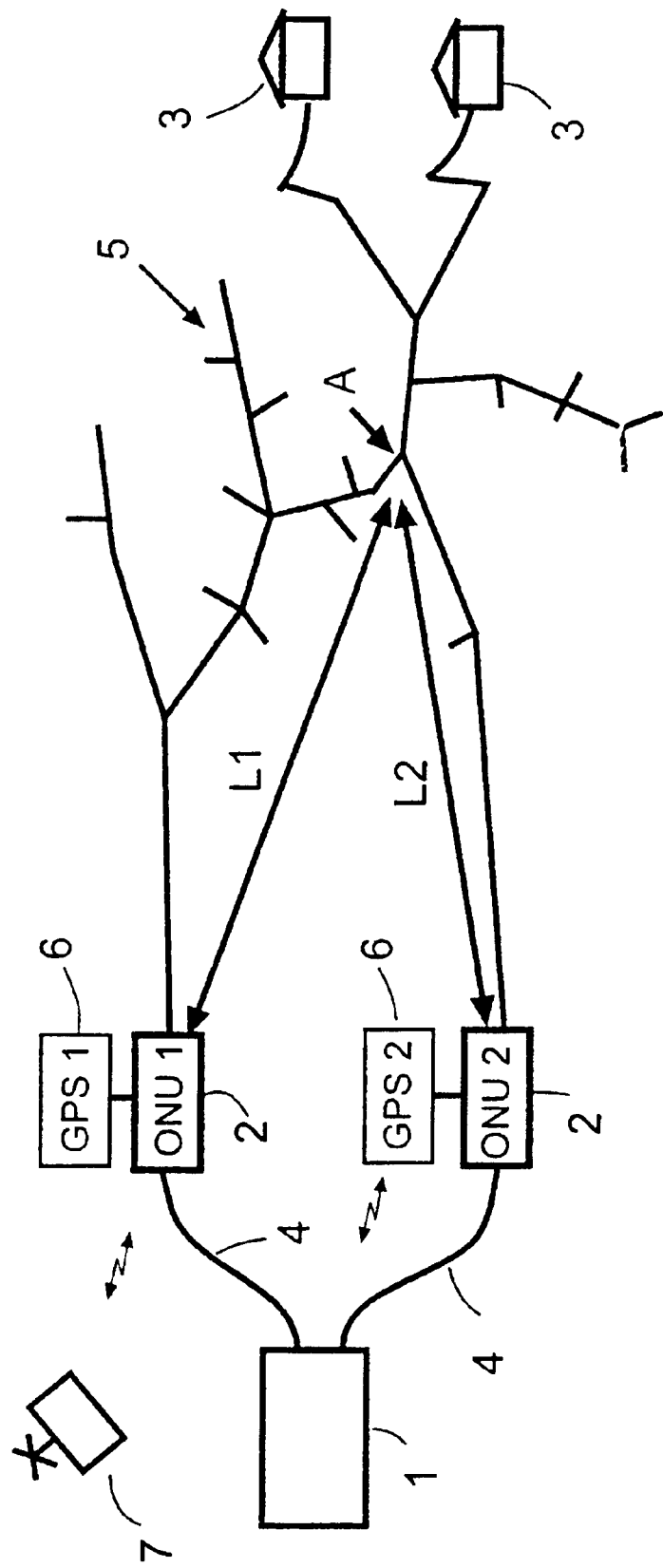

In the figure is shown diagrammatically a DMT-VDSL-system which has been adapted according to the present invention. In conventional way the VDSL-system includes a local station or exchange 1, VDSL-nodes 2, ONU 1 and ONU 2, and subscribers 3. In order to achieve higher data rate in the system, the transmission is made on optical fibre 4 between the local station 1 and the nodes 2, whereas the existing copper cable network 5 is used between the nodes 2 and the subscribers 3. As has been mentioned previously, different nodes can utilize a common part of the access network to the subscribers, in the figure between a point A and up to the subscribers, and separate parts, i.e. between the point A and respective node 2. The problem is that the lengths between respective node 2, and the point A are different, i.e. L1≠L2. By that the orthogonality between the signals in the DMT-VDSL-system can be lost and near end cross talk between the systems arise. This problem can be solved by synchronizing the nodes with regard to the different lengths L1 and L2.

The present inventors has realized that it is advantageous to use GPS (Global Positioning System) to synchronize the optical nodes in a VDSL-system. It is possible to get a time signal from commercially available GPS time reference receivers, with internal rubidium oscillator, which has an accuracy better than ±5 ns and a jitter less than 1 ns. This means that two nodes which have been synchronized with this type of GPS-receiver will have less than 12 ns frame time difference in the downlink data flow. If a GPS-receiver with an ordinary oscillator with high stability (OXCO) is used, the accuracy will decrease to about 60 ns. This is still useful in this application.

The GPS-system is today wellknown and is pursued by U.S. Department of Defence. In addition to the ordinary position coordinates, the system also can deliver a time reference with high precision. In order to better understand the invention, some aspects of a conventional GPS-receiver are here described.

Some GPS-receivers dedicated to time reference applications use carrier phase measuring with high resolution besides the C/A-code tracking which is used in all normal equipment. This makes it possible to extract very stable and accurate frequency information. The high frequency of this carrier, 1,57542 GHz gives and time and frequency resolution which is 10 000 times higher than what can be achieved by use of only C/A-correlation (at given signal/noise-ratio and mean time). The resolution is so high that the frequency of the local oscillator can be measured to $1 \times 10^{-10}$ in less than 0,1 s. Receivers which use this technology can almost instantly detect any deviation of the local oscillator and make rapid corrections, which in its turn results in very accurately controlled short time stability, also with a cheap chrystal.

If the receiver also follows all satellites within the range and performs time and frequency averaging, the errors caused by each single satellite is minimzed. The URA (User Range Accuracies) of the satellites, i.e. accuracies of the range for the users, are sometimes also included in the averaging process, as is the receiver's ability to suppose that it is stationary in relation to the earth. The poor time accuracies which are given in many GPS-reveiver specifications often depends on that they relate to mobile reception.

Usually the commercially available receivers have a PPS-output (pulse per second) which refer to GPS/UTC-time, i.e. a true time pulse. Receivers which use all the mentioned methods and also use internal rubidium oscillators can deliver a PPS-output signal which has an accuracy referred to GPS/UTC of ±5 ns with a jitter which is less than 1 ns. The time it will take to get this accuracy depends on the satellite constellation in question, the amount of SA that is used, but above all on how accurate the position can be given to the receiver at the start. If it has to search its position itself, the time to get the mentioned accuracy may be up to 24 hours. If the position is well-known it takes 1–2 hours.

If a receiver with an ordinary, rather cheap, high-stable OXCO-oscillator is used, which in most cases should be sufficient, the PPS-accuracy will be reduced to about 60 ns. A cheap OXCO-oscillator gives typically an accuracy of 100 ns at best, and may in some cases be a sufficiently good solution. GPS-receivers with this types of internal oscillators will reach their indicated accuracies typically in the same time as those which are equipped with rubidium oscillators.

If the receivers also utilize differential GPS, DGPS, which technology exists in some countries, even higher precision can be achieved, or the precision can be achieved faster.

Returning to the figure; if two or more nodes in a DMT-VDSL-system shares a common part of the access network, as is shown, the nodes 2 must be synchronized to minimize the near end cross talk due to non-orthogonality between adjacent pairs. The demands on this synchronization depends in the DMT-case mainly on the width of the guard space and the distance to the most distant subscriber.

With poor synchronization smaller guard space is available for the propagation delay margin, and by that the usable distance to the most distant subscriber will be shorter. As good a synchronization as possible is of course therefore wanted. Preferably the nodes should be synchronized within 1% of the guard space or 1–2 sample. This means 64 ns respective 50–100 ns in a DMT-VDSL-system with guard space of 128 samples and 50 ns sampling interval.

These demands are met with by the PPS-signal from the GPS-receiver. By letting the PPS-signal be the main clock edge which decides the frame synchronization in a DMT-VDSL-system, the synchronization of the nodes will be an easy task.

The GPS-receivers of this kind usually have reference clock outputs with 1, 5 and 10 MHz, or user specific outputs. These are locked to the input GPS-carrier signal.

The PPS-signal in its turn is locked to the reference clock output signal. This output reference clock has a phase stability which usually is better than 140 dBc/Hz at 1 kHz carrier wave displacement and is well suited to be the sampling clock in the VDSL-modem. If many user specified outputs are defined, all locked together, the frame clock to the modem might some other output signal.

The cable length L1 from the node ONU 1 in FIG. 1 to the point A and the cable length L2 from the node ONU 2 to the point A, must be measured at the system installation, This can be performed in many different ways, but is preferably performed with the instrumentation which already exists at Telcos, for instance Time Domain Reflectrometry, TDR. When the lenghts have been measured, the signals are delayed with corresponding propagation time. The delay is realized via an adjustment of the PPS-signal in relation to the time reference UTC in respective receiver GPS-1 and GPS-2.

The accuracies of the receivers result in a synchronization in the downlink traffic at point A in FIG. 1 which is better than 12 ns if GPS-receivers with internal rubidium oscillators have been used. The synchronization accuracy in the downlink traffic is given as (PPS-accuracy+jitter)×2.

Accordingly the present invention provides an arrangement to obtain synchronization of VDSL-nodes in a DMT-VDSL-system with a shared access network by use of GPS.

Commercial GPS-receivers can be used, but it is also possible to tailor-make the receivers according to the DTM-VDSL-demands with regard to wanted sampling pace and frame pace. An expert in the field of course realizes that it is possible to extract a time reference from other systems, for instance the cesium-controlled clock from the SDH-transport network, or the also cesium-controlled clock in the line synchronization which is used in countries with PAL-modulated ground-transmitted television. It is also possible to implement the synchronization in the local station if there are unoccupied fibres between the local station and the nodes. The extent of protection of the invention is only restricted by the patent claims below.

What is claimed is:

1. A method for synchronization of nodes in a VDSL system, the method comprising:
   connecting VDSL-nodes to a local station with optical fibers;
   connecting the VDSL-nodes to subscribers via a copper cable network including separate access connections and at least a common access connection; and
   synchronizing the VDSL-nodes to a common external time reference to reduce near end cross talk between the VDSL-nodes.

2. The method according to claim 1, wherein each VDSL-node includes a receiver for a synchronization signal and an internal oscillator to deliver a clock signal.

3. The method according to claim 2, wherein the internal oscillator comprises a rubidium oscillator.

4. The method according to claim 2, wherein the receiver comprises a satellite receiver.

5. The method according to claim 4, wherein synchronizing the VDSL-nodes comprises receiving signals, at the satellite receiver, from a plurality of satellites and averaging the received signals with respect to time and frequency to generate the synchronization signal.

6. The method according to claim 2, wherein the clock signal is used as sampling signal by each respective node.

7. The method according to claim 2, wherein the receiver is a GPS-receiver.

8. A method for synchronization of nodes in a VDSL system, the method comprising:
   connecting VDSL-nodes to a local station with optical fibers, each VDSL-node including a GPS-receiver for receiving at least one time-reference signal and generating a synchronization signal, and an associated internal oscillator to deliver a clock signal;
   connecting the VDSL-nodes to subscribers via a copper cable network including separate access connections and at least a common access connection; and
   synchronizing the VDSL-nodes to the at least one time-reference signals to reduce near end cross talk between the VDSL-nodes.

9. The method according to claim 8, wherein the internal oscillator comprises a rubidium oscillator.

10. The method according to claim 8, wherein the GPS-receiver receives time-reference signals from a plurality of satellites and averages the time-reference signals with respect to time and frequency to generate the synchronization signal.

11. The method according to claim 8, wherein the clock signal is used as sampling signal by each respective node.

12. A VDSL system comprising:
   VDSL-nodes connected to a local station via optical fibers, each VDSL-node including a GPS-receiver for receiving at least one time-reference signal and generating a synchronization signal, and an associated internal oscillator to deliver a clock signal; and
   a copper cable network including separate access connections and at least a common access connection connecting the VDSL-nodes to subscribers;
   the VDSL-nodes being synchronized to the at least one time-reference signal to reduce near end cross talk between the VDSL-nodes.

13. The system according to claim 12, wherein the internal oscillator comprises a rubidium oscillator.

14. The system according to claim 12, wherein the GPS-receiver receives time-reference signals from a plurality of satellites and averages the time-reference signals with respect to time and frequency to generate the synchronization signal.

15. The system according to claim 12, wherein the clock signal is used as sampling signal by each respective node.

* * * * *